United States Patent [19]

Takematsu

[11] 4,394,079

[45] Jul. 19, 1983

[54] PHOTOGRAPHIC FLASH DEVICE OPERATIVELY RESPONSIVE TO THE LUMINANCE OF AN OBJECT TO BE PHOTOGRAPHED TO PREVENT OVEREXPOSURE

[75] Inventor: Yoshiyuki Takematsu, Tokyo, Japan

[73] Assignee: Fuji Koeki Kabushiki Kaisha, Tokyo, Japan; a part interest

[21] Appl. No.: 276,510

[22] Filed: Jun. 23, 1981

[30] Foreign Application Priority Data

Jun. 26, 1980 [JP]  Japan ................................. 55-85953
Jul. 18, 1980 [JP]  Japan ................................. 55-97571

[51] Int. Cl.³ ............................................ G03B 15/03
[52] U.S. Cl. ........................................ 354/33; 354/35
[58] Field of Search .................... 354/32, 33, 34, 35; 315/241 P

[56] References Cited

U.S. PATENT DOCUMENTS 3,855,601 12/1974 Uchiyama et al. .............. 354/34 X
3,953,864 4/1976 Iwata et al. ...................... 354/33 X
3,978,496 8/1976 Matsumoto ...................... 354/34 X
4,086,582 4/1978 Kiyohara et al. .................... 354/33

*Primary Examiner*—Michael L. Gellner
*Attorney, Agent, or Firm*—Finnegan, Henderson, Farabow, Garrett & Dunner

[57] ABSTRACT

A photographic flash control device for enabling the firing of a flash light when the luminance level of an object to be photographed is less than a predetermined level and for inhibiting the firing of the flash light when the luminance of an object to be photographed is brighter than a predetermined level. A DC-DC converter generates an oscillating signal for charging a main discharge capacitor. A photoconductive device inhibits the generation of the oscillating DC signal when the luminance level of the object to be photographed exceeds a predetermined level. If the main discharge capacitor is charged to a predetermined firing level, firing of the flash light by a triggering circuit will be inhibited if a sudden change in illumination causes the luminance of the object to be photographed to exceed the level where a flash light is necessary.

12 Claims, 13 Drawing Figures

PHOTOGRAPHIC FLASH DEVICE OPERATIVELY RESPONSIVE TO THE LUMINANCE OF AN OBJECT TO BE PHOTOGRAPHED TO PREVENT OVEREXPOSURE

FIELD OF THE INVENTION

The present invention relates to a photographic flash device for illumination of an object to be photographed.

BACKGROUND OF THE INVENTION

A flash device is usually used when an object or field to be photographed is relatively dark. Nonetheless, it is impossible to give a uniform or general standard of brightness or darkness at which a flash device is to be used for synchronized photographing. This decision is commonly left to an individual photographer's determination. It is for this reason that synchronized photographing illuminated with a flash device is often overexposed.

This problem has been substantially overcome by a flash device having an automatic light quantity adjusting function in which the time duration for flash light discharge depends upon various optical factors including the object distance and the luminance of the object. However, the problem still remains unresolved for compact flash devices having no such adjusting function, for example, a flash device incorporated into the camera body.

A similar problem is also encountered when a photographer is photographing a relatively bright object without resetting a flash device already set to be ready for flash discharge. Although the operation of the flash device is easily prevented by, for example, the opening of a source switch for the flash light, it is not uncommon for the photographer to forget to disable flash light discharge especially when an object to be photographed suddenly becomes bright during synchronized flash light photographing.

To overcome the above-mentioned problems the present invention provides an improved photographic flash device wherein the device is prevented from firing a flash light when an object to be photographed is brighter than a predetermined level but wherein flash light triggering is enabled when the object to be photographed is darker than the predetermined level.

OBJECTS AND SUMMARY OF THE INVENTION

It is an object of the present invention to provide a photographic flash device that enables flash light firing when an object to be photographed is darker than a predetermined luminance level.

Another object of the present invention is to provide a photographic flash device built into a camera having a flash cube which is arranged within the camera and is automatically displaceable to an operative or non-operative position in response to the luminance of an object to be photographed.

To achieve these and additional objects, and in accordance with the purpose of the invention, as embodied and broadly described herein, the photographic flash device operatively responsive to the luminance of an object to be photographed comprises a DC power source, a main discharge capacitor coupled to the DC power source for charging thereby and for providing a flash trigger signal when charged to a predetermined level, a flash light discharge tube coupled to the main discharge capacitor for generating an illuminating flash in response to the flash trigger signal, and an object luminance detector coupled to the DC power source for detecting the luminance of the object to be photographed and for preventing the charging of the main discharge capacitor to the predetermined level when the detected luminance is greater than a preselected value whereby the flash trigger signal is not generated and the illuminating flash is inhibited if the luminance of the object to be photographed is greater than the predetermined value.

The accompanying drawings, which are incorporated in and constitute a part of this specification, illustrate embodiments of the invention and, together with the description, serve to explain the principles of the invention.

DETAILED DESCRIPTION OF THE INVENTION

Figure 1:
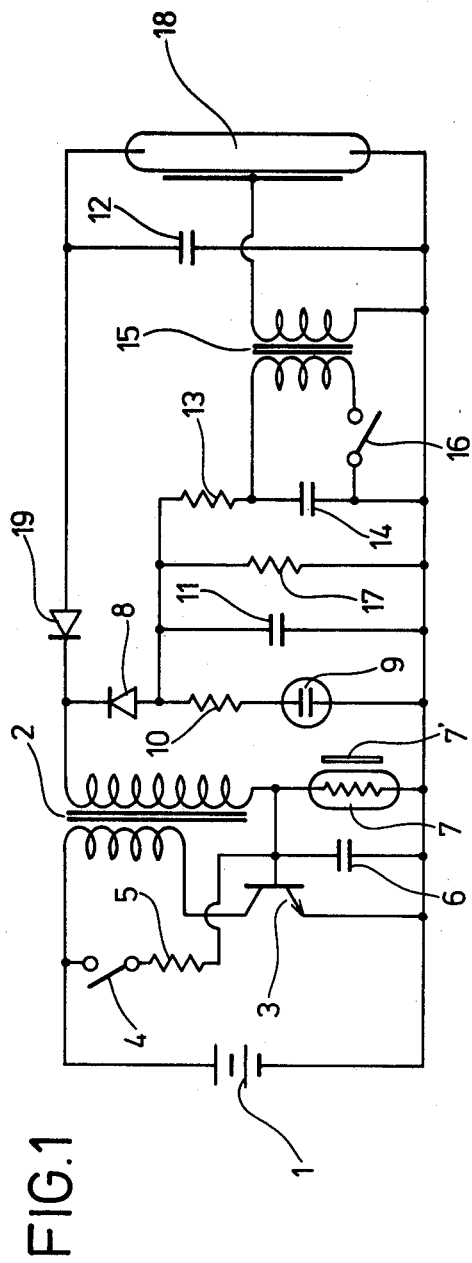
FIG. 1 is a circuit diagram illustrating an embodiment of the flash device according to the present invention, by which a flash light discharge is enabled only when an object to be photographed is darker than a predetermined luminance level.

FIG. 1 is a circuit diagram illustrating a basic embodiment of the flash device according to the present invention in which a DC-DC converter comprises a DC power source. The DC power source comprises a source battery 1, an oscillation transformer 2, and a switching means herein embodied as a switching transistor 3. Electric current flowing through a primary coil of the transformer 2 is supplied from the source battery 1 and intermittently interrupted by the transistor 3. The transistor 3 is connected at its collector to the primary coil of the transformer 2. The base of the transistor 3 is connected through a manual switch 4 and a protective resistor 5 to the positive pole of the source battery 1 and is also connected to one terminal of a secondary coil of the transformer 2. The transistor 3 is turned ON by the base current flowing from the source battery 1 upon closure of the manual switch 4. This initiates oscillation and thereafter the transistor 3 is repeatedly turned ON and OFF under the action of the magnetic saturation of the transformer's core during oscillation. A capacitor 6 is connected across the base-emitter junction of the transistor 3 to stabilize oscillation.

As herein embodied, a luminance detecting means comprises a photoconductive element 7 connected across the base-emitter junction of the transistor 3 in the same manner as the capacitor 6. The photoconductive element 7 functions as a detector means to detect the luminance level of an object to be photographed. When the object luminance is detected to exceed a predetermined luminance level, for example 9 to 10 LV, a connection across base-emitter junction of the transistor 3 is established by a resistor having a low resistance. This reduces the base voltage to a level lower than the operating voltage, maintaining the transistor 3 in OFF-state. This resistor cooperates with the photoconductive element 7 to maintain the transistor 3 OFF as long as the luminance level of the object to be photographed remains above the predetermined level.

There is provided a member 7', such as a filter or a diaphragm, for adjustment of the incident light in the optical path of the photoconductive element 7 so that the level of base voltage of the transistor 3 may be adjusted. A first serial section comprising a neon lamp 9 and a resistor 10 connected through a diode 8 to the output side of the transformer 2 and a capacitor 11 connected in parallel to the first serial section constitute a display circuit adapted to be lit and thereby to display when the charging voltage of a main discharging capacitor 12 exceeds a predetermined value.

A second serial section comprising a charging resistor 13 and a trigger capacitor 14 connected to each other via the diode 8, a boosting transformer 15, and a trigger switch 16 constitute a means for triggering the flash light in a manner well known in the art. The combination of a discharging resistor 17 connected in parallel to the second serial section of the charging resistor 13 and the capacitor 14 constitutes a means for preventing the triggering of the flash light. The flash light discharge tube 18, of a type well known in the art, is supplied with the trigger voltage from the trigger means and is fired upon the application of the current discharged from the main discharging capacitor 12. A diode 19 is connected to a part of the charging circuit for the main discharging capacitor 12 to block the current flowing from the capacitor 12 into the capacitor 11 and the trigger capacitor 14.

With the circuit arrangement of the flash device as above mentioned, even when the manual switch 4 is closed, the DC-DC converter is not activated to initiate oscillation so long as the luminance of the object to be photographed is higher than a predetermined value. The resistance value of the photoconductive element 7 decreases and establishes a connection (short circuit) across the base-emitter junction of the transistor 3 so that the latter remains in its OFF-state. As a result, no flash light discharge occurs in such situation.

When the object is darker than the predetermined luminance value, however, the resistance value of the photoconductive element 7 is sufficiently high so that closure of the manual switch 4 causes the capacitor 6 to be charged with the current flowing through the switch 4 from the battery 1 until the charging voltage of the capacitor 6 reaches a predetermined value. At this point, the transistor 3 is turned ON. When the transistor 3 is ON, the DC-DC converter initiates its oscillation and thereafter the transistor 3 is repeatedly turned ON and OFF responsive to the magnetic saturation of the transformer core to continue the oscillation.

The main discharging capacitor 12 is progressively charged as the oscillation continues and, when the charging voltage of this capacitor 12 reaches a predetermined value, the neon lamp 9 is lit by the application of the charging voltage of the constant-potential capacitor 11.

When the main discharging capacitor 12 has been charged to a certain level higher than a predetermined value, the charging current for the capacitor 12 is considerably reduced. This causes the base current, which is based on the magnetic saturation of the transformer core, to become too small to turn ON the transistor 3. The oscillation continues and therefore the neon lamp 9 also continues to be lit for so long as the manual switch 4 remains closed. As long as the oscillation continues, the trigger capacitor 14 can hold a predetermined charging voltage.

Accordingly, a shutter release following immediately after confirming that the neon lamp 9 is properly lit can cause the flash light discharge tube 18 to be applied fired responsive to the application of the trigger voltage upon closure of a trigger switch 16.

When flash light discharge becomes no longer necessary, such as the case when an object to be photographed suddenly becomes bright during a synchronized flash light photographing, the resistance value of the photoconductive element 7 decreases and as a result the transistor 3 is held in the OFF-state, terminating the oscillation of the DC-DC converter.

Upon termination of oscillation, the charging voltage of the capacitor 11 and the trigger capacitor 14 is discharged via the discharging resistor 17 and, in consequence, the neon lamp 9 is extinguished. The trigger means no longer generates the trigger voltage even if the trigger switch 16 is closed because the capacitors 11 and 14 are no longer charged by the main discharging capacitor 12 since the diode 19 blocks the discharge of the capacitor 12. Thus, the flash light discharge is prevented when the object to be photographed suddenly becomes bright even after the main discharging capacitor 12 has already been charged to a certain level higher than a predetermined value. Furthermore, termination of the flash light discharge can be achieved without the opening of the manual switch 4.

Figure 2:
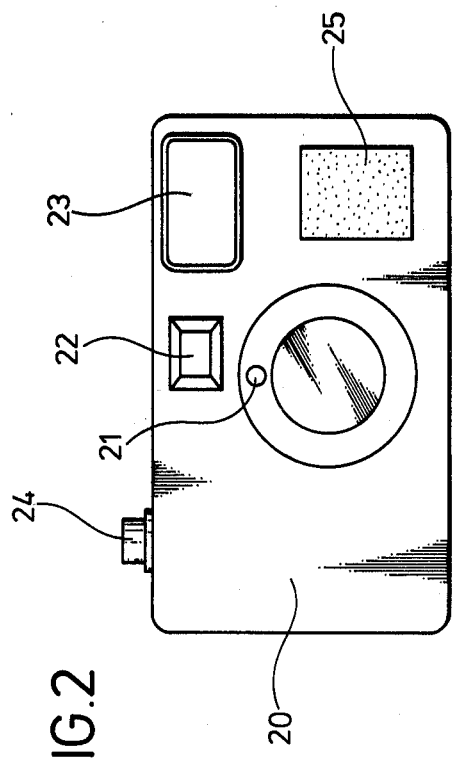
FIG. 2 is a schematic front view of a photographic camera containing the flash device of FIG. 1.

The circuit arrangement as above mentioned can find an effective application when the flash device is incorporated into a camera body 20 as shown in FIG. 2. The camera body 20 includes a light-receiving window 21 for the photoconductive element 7 arranged in the front of a lens barrel, a viewfinder window 22, a flash cube 23, a shutter button 24, and a sheet 25 of electrically conductive caoutchouc which forms a camera body switch in the place of the manual switch 4.

A switch utilizing such a sheet 25 of electrically conductive caoutchouc is well known in the art and may comprise a sheet of low resistance caoutchouc material mixed with powdery carbon or metal. A plurality of electric terminals are arranged on the rear side thereof so that depression of the sheet causes a short-circuit across the terminals. Alternatively, the sheet 25 of caoutchouc material may have its electrical resistance reduced as the force of depression exerted thereon increases and a plurality of electric terminals, arranged on the rear side thereof, may be short-circuited as a result.

With the arrangement as above mentioned, the starter switch for the DC-DC converter can be closed simply by holding the camera 20 in the hand. The photoconductive element 7, being responsive to the luminance of an object to be photographed upon directing the camera viewfinder toward the object, will terminate oscillation of the DC-DC converter as in the embodiment of FIG. 1 when the object is brighter than a predetermined value. It should be understood that the light receiving window 21 of the photoconductive element 7 may be located at a suitable position other than the front of the lens barrel as long as the window 21 can be properly exposed to the incident light.

Another feature of this embodiment lies in that the oscillation of the DC-DC converter is automatically terminated by the release of the photographer's grasp of the camera. As apparent from the circuit diagram of FIG. 1, the opening of the switch 4 in the situation that the main discharging capacitor 12 has already been charged to a level higher than the predetermined value blocks the base current of the transistor 3 in response to the magnetic saturation of the transformer cores. This prevents the transistor 3 from being turned ON and thereby the oscillation of the DC-DC converter is immediately terminated. Accordingly, employment of the embodiment of FIG. 2 in which the switch 4 is automatically opened by the release of the photographer's grip of the camera effectively solves the problem that careless storage of the camera with the source switch remaining closed results in the depletion of the battery energy.

Figure 3:
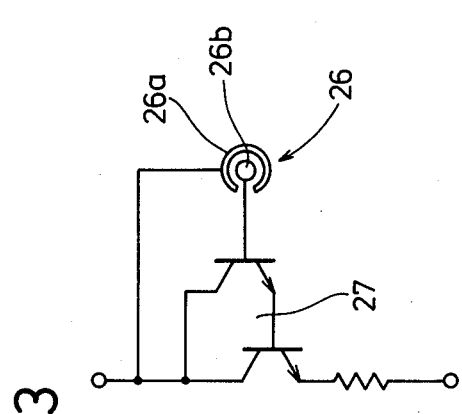
FIG. 3 is a schematic view showing a starter switch for the flash device incorporated in the shutter button of the camera of FIG. 2.

The camera body switch comprising the sheet 25 of electrically conductive caoutchouc material may be replaced by a similar switch arranged in the shutter button 24. One of such replacements is shown by FIG. 3 in which a pair of electric terminals 26a, 26b in the top surface of the shutter button 24 is connected to the input side of a Darlington circuit 27.

With the manual switch 4 thus arranged, the terminals 26a, 26b can be short-circuited simply by a touch on the shutter button 24 with a finger of the photographer's hand and thereby the DC-DC converter can be started with the current amplified by the Darlington circuit 27. By this embodiment, the effect of the arrangement of FIG. 2 can also be obtained.

With the circuit arrangement of FIG. 1 there is a possibility that the circuit operation lacks stability due to some deviation appearing between the object luminance at which the oscillation is enabled and the object luminance at which the oscillation is terminated.

Figure 4:
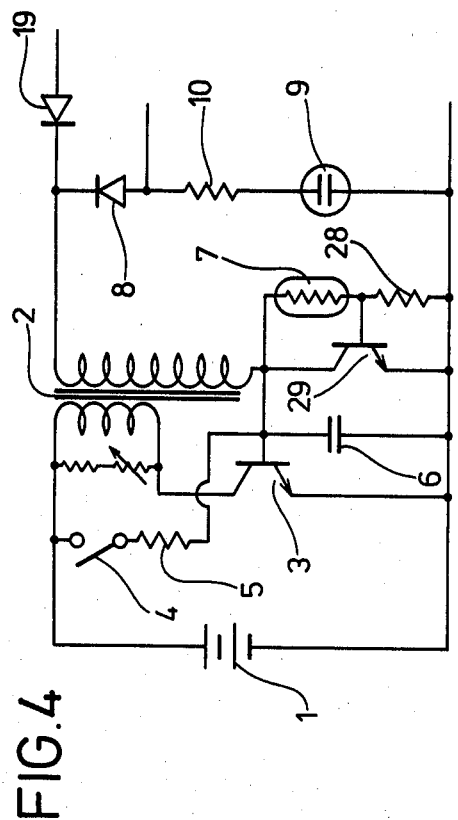
FIGS. 4 to 7 and 9 are circuit diagrams illustrating alternate embodiments of the flash device of the present invention operatively responsive to the luminance of an object to be photographed.

FIG. 4 is a circuit diagram illustrating a second embodiment of the present invention which is similar to the embodiment of FIG. 1 except that a switching transistor 29 having its base applied with a divided voltage obtained from the photoconductive element 7 and a resistor 28 is connected across the base-emitter junction of the oscillation transistor 3. According to this embodiment, a short circuit is established across the base-emitter junction of the oscillation transistor 3 when the object is brighter than a predetermined value since the switching transistor 29 then transfers to its ON state.

Figure 5:
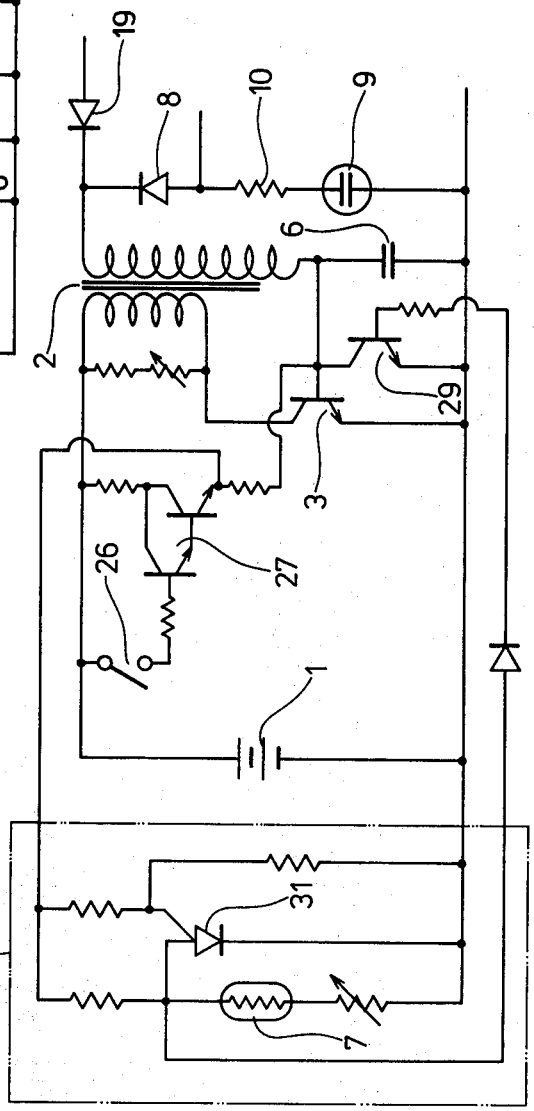

FIG. 5 is a circuit diagram illustrating a third embodiment of the present invention which is similar to the embodiment of FIG. 1 except that the shutter button switch (as shown by FIG. 3) is adopted as the starter switch for the DC-DC converter. The switching transistor 29 is connected across the base-emitter junction of the oscillation transistor 3, as in the embodiment of FIG. 4, and a detector circuit 30 is provided to detect the luminance of an object to be photographed. The detector circuit 30 includes the photoconductive element 7 and a PUT element 31. It should be noted here that the switch 26 corresponds to the switch provided with the terminals 26a, 26b as shown in FIG. 3.

With this embodiment, the starter switch 26 is closed simply by a touch of the shutter button with the photographer's finger so that the detector circuit 30 is energized via the Darlington circuit 27 and simultaneously the oscillation transistor 3 is applied with the base current. When the object luminance is brigher than a predetermined value, the resistance value of the photoconductive element 7 decreases and thereby the PUT element 31 is held in its OFF-state. In consequence, the transistor 29, which is applied with the detection signal from the detector circuit 30, is now turned ON and causes a short circuit across the base-emitter junction of the transistor 3. When the object luminance is lower than the determined value, the PUT element 31 is turned ON and, therefore, the transistor 29 is turned OFF. The result is that the oscillation transistor 3 is turned ON by application of the base current.

Thus, in response to an object brighter than the predetermined value, the oscillation of the DC-DC converter is terminated and thereafter the same operation as that provided by the embodiment of FIG. 1 is obtained. However, the third embodiment is distinguished from the basic embodiment of FIG. 1 in that the precision with which the object luminance can be detected is substantially improved by the PUT element 31 incorporated in the detector circuit 30. The operation of terminating or cancelling the DC-DC converter is, therefore, more sensitive than in the basic embodiment of FIG. 1.

Figure 6:
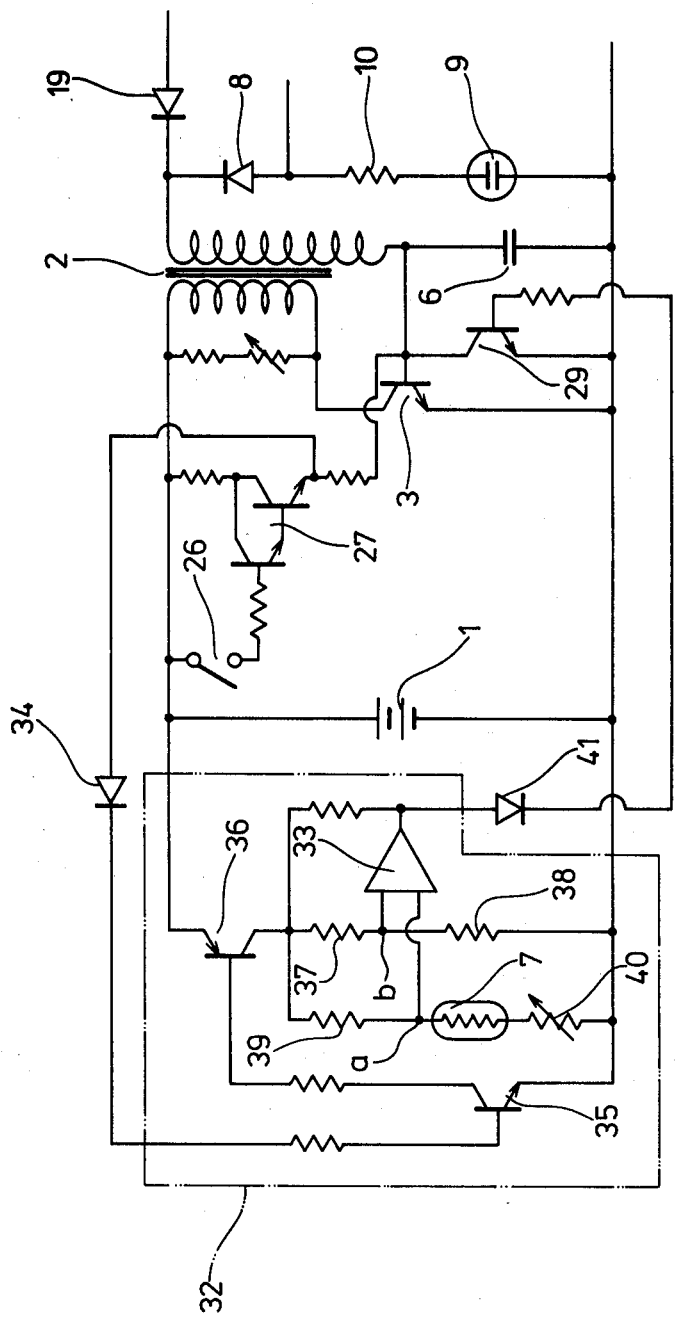

FIG. 6 is a circuit diagram illustrating a fourth embodiment of the present invention which is similar to the embodiment of FIG. 5 except that a comparator 33 is used in the detector circuit 32 to detect the luminance of the object to be photographed.

With this embodiment, the switch 26 is closed simply by a touch on the shutter button with the photographer's finger and thereupon the current flowing through the Darlington circuit 27 and a counterflow check diode 34 is applied to the base of a transistor 35 included in the detector circuit 32. In consequence, the transistor 35 is turned ON and also a transistor 36 connected in cascade thereto is turned ON. Upon the turning ON of the transistor 36, a voltage divider circuit comprising resistors 37,38 and another voltage divider circuit comprising a resistor 39, the photoconductive element 7, and an adjustable resistor 40 are energized by the source battery 1, resulting in predetermined voltages appearing at the voltage dividing terminals a and b. The comparator 33 receives the respective voltage signals appearing at the voltage dividing terminals a and b and is either turned OFF when the object is brighter than a predetermined value or turned ON when the object is darker than the predetermined value.

In this manner, the detector circuit 32 provides a signal with which the transistor 29 is applied via a counterflow check diode 42 and thereby turned ON when the object is brighter than the predetermined value and provides a signal with which the transistor 29 is turned OFF when the object is darker than the predetermined value.

With this embodiment, the DC-DC converter is terminated when the object is sufficiently bright and similar operation as in the embodiments of FIGS. 1 and 5 is obtained.

Although the starter switch 26 has been described as the shutter button switch with regard to the embodiments of FIGS. 5 and 6, it should be understood that this switch may be a camera body switch comprising the sheet 25 of electrically conductive caouthouc material and may also be a manual switch particularly in the case where the flash device is realized in the form of an independent device, instead of being incorporated into the camera as a so-called built-in flash device.

Figure 7:
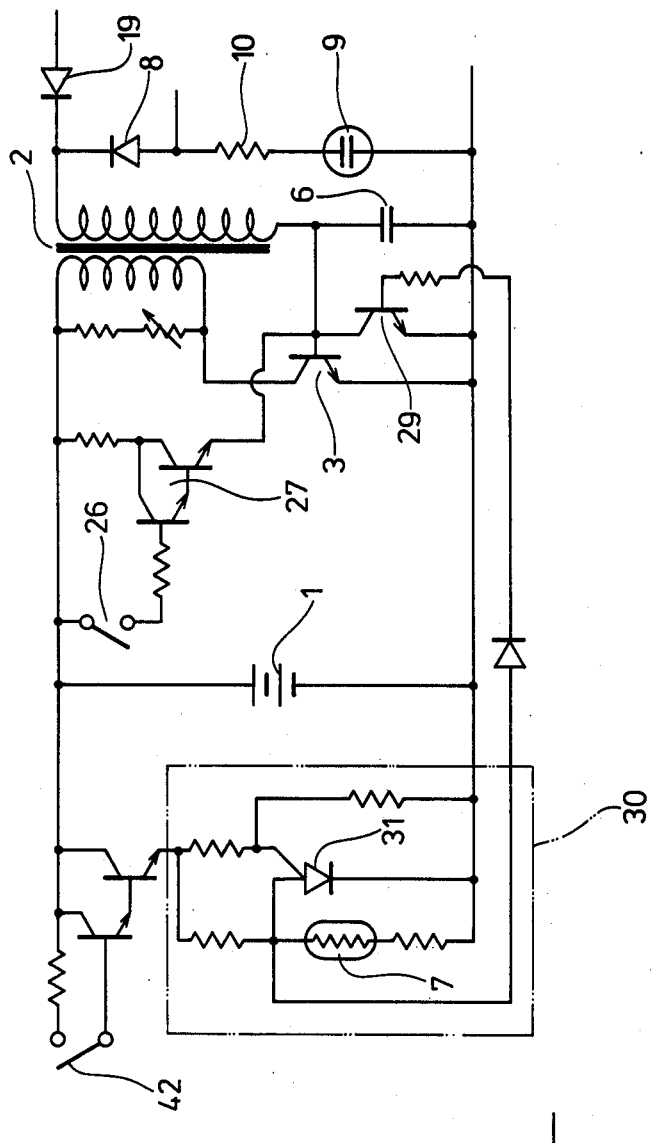

FIG. 7 is a circuit diagram illustrating yet another embodiment of the present invention which corresponds to a variation of the embodiment of FIG. 5, i.e., an embodiment in which the camera body switch as shown by FIG. 2 is adopted as the start switch 26 and the detector circuit 30 further includes an energizing switch 42 connected thereto. This energizing switch 42 may be the shutter button switch as shown by FIG. 3.

With such an arrangement, the DC-DC converter initiates its oscillation simultaneously as the camera is held by the photographer's hand, and thereafter, the detector circuit 30 is activated simply by a touch on the shutter button with the photographer's finger. This makes it unnecessary for the photographer to keep a finger on the shutter button until the charging of the flash device is completed as is required in the embodiment of FIG. 5.

Figure 8:
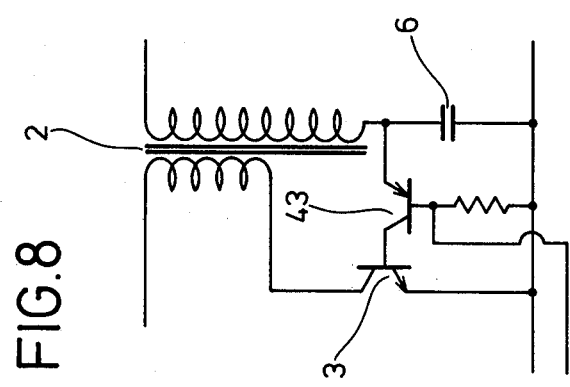
FIG. 8 is a partial circuit diagram illustrating a modification to the circuit embodiments of FIGS. 1, 4 to 7 and 9.

In the respective embodiments illustrated in FIGS. 4, 5, 6, and 7, and as have been described hereinabove, the switching transistor 29 causes a short circuit across the base-emitter junction of the oscillation transistor 3 and thereby oscillation of the DC-DC converter is terminated. This arrangement may be modified so that, as seen in FIG. 8, the base of the oscillation transistor 3 is blocked by a switching transistor 43 which is, in turn, under control of the detector circuit.

Figure 9:
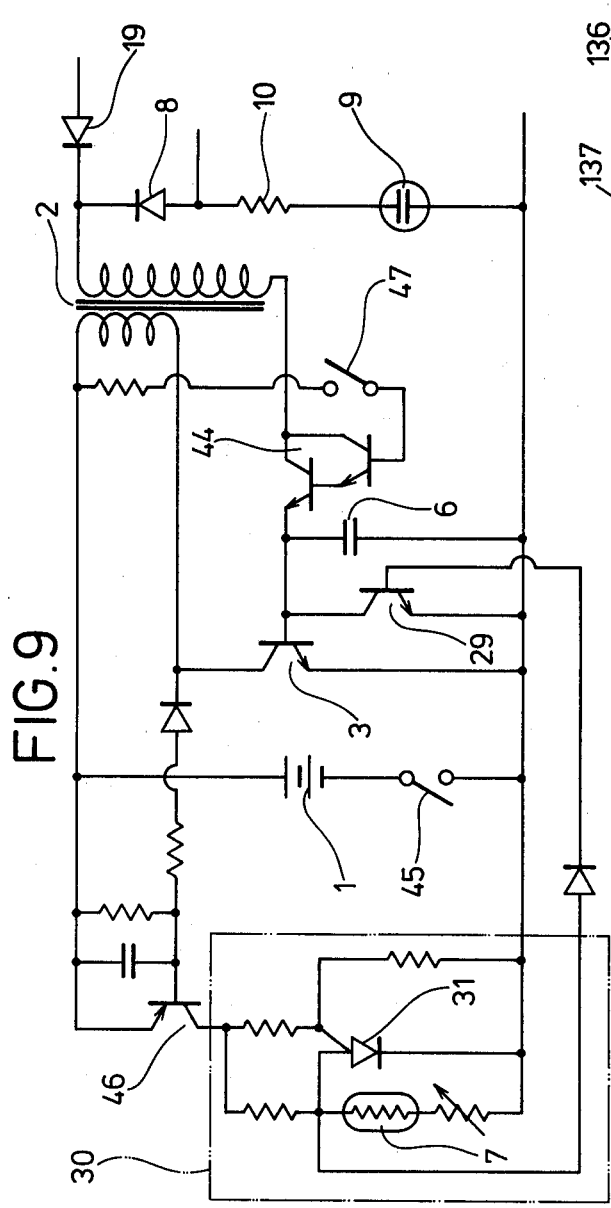

FIG. 9 is a circuit diagram illustrating another embodiment of the present invention which is substantially identical to those illustrated in FIGS. 5 and 6 except that a Darlington circuit 44 is adapted to be turned ON only when a starter switch 47 is closed is connected to the base of the oscillation transistor 3. A detector circuit 30 similar to that in the embodiment of FIG. 5 can be energized via a transistor 46 upon closure of a source switch 45.

The manner in which this embodiment operates is similar to that of the embodiments illustrated by FIGS. 5 and 6 except that the DC-DC converter continues its oscillation so long as the starter switch 47 remains closed.

It will be obvious from the foregoing description that the flash device, according to the present invention, permits a flash light discharge to be automatically terminated when an object to be photographed is brighter than a predetermined value and enables flash light discharge only when the object is darker than the predetermined value. The photographer is relieved of the worry about whether the flash light discharge is necessary. Synchronized flash light photographing based on misjudgment of the luminance of an object to be photographed can be avoided.

According to the present invention, the flash light discharge is automatically terminated when an object to be photographed suddenly becomes bright and, therefore, a careless shutter release without cancellation of the state of readiness for the flash light discharge would not lead to actual discharge, thus preventing a failed photographing.

Figure 10:
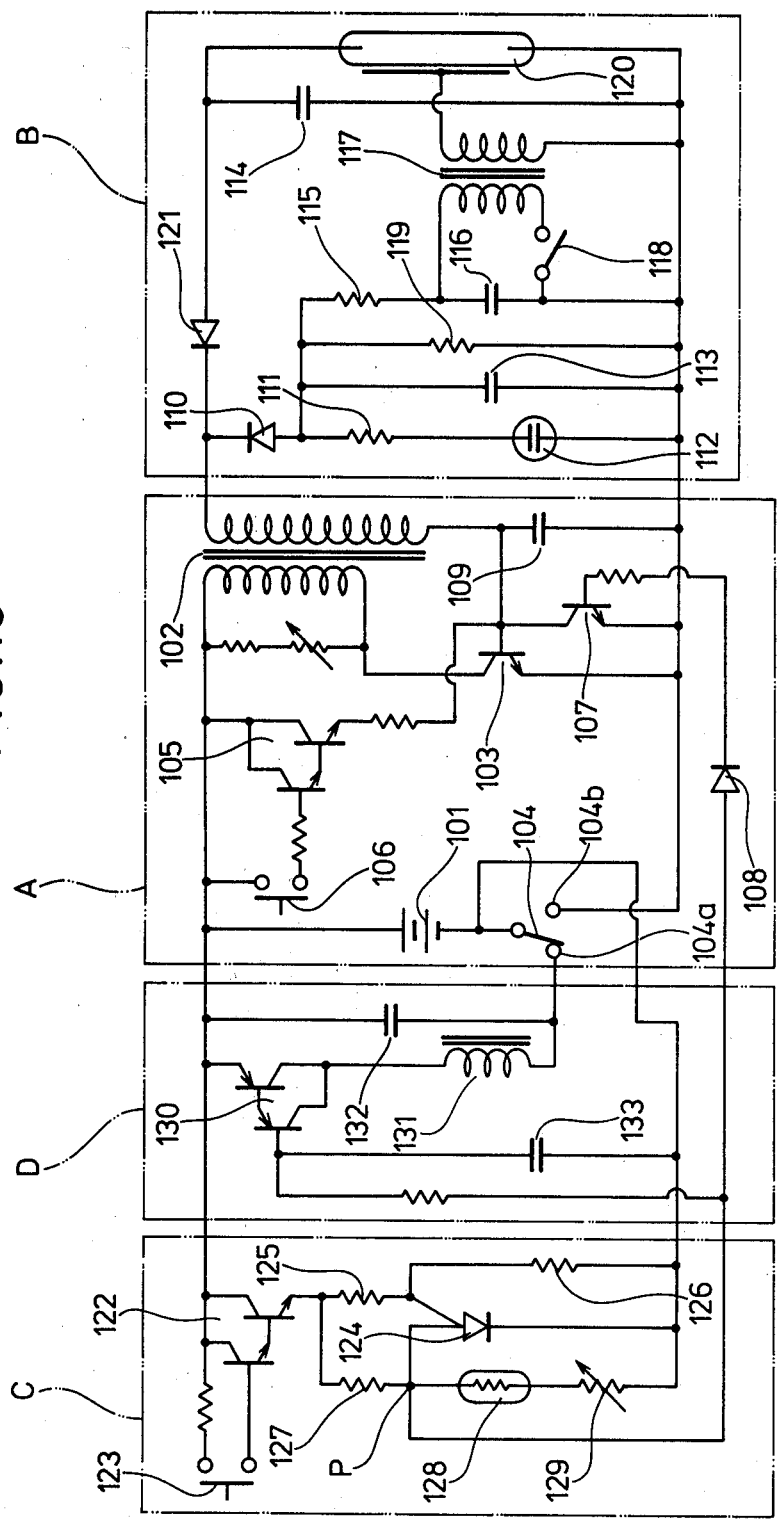
FIG. 10 is a circuit diagram illustrating yet another embodiment of the flash device according to the present invention, in which a flash cube is displaced from its storage position within the camera to its operative position to enable a flash light discharge when an object to be photographed is darker than a predetermined luminance level.

FIG. 10 is a circuit diagram illustrating another embodiment of the photographic flash device according to the present invention. In this embodiment, the circuit arrangement comprises sections respectively enclosed by double-dotted chain lines. Of these sections, section A corresponds to a source circuit, section B corresponds to a firing circuit, section C corresponds to a detector circuit to detect the luminance level of an object to be photographed, and section D corresponds to a responder circuit including a drive means for a flash cube.

The source circuit A constitutes a DC-DC converter comprising a source battery 101, an oscillation transformer 102, a switching transistor 103, a Darlington circuit 105, and a camera body switch 106 similar to that as mentioned with reference to the preceding embodiments. A converter comprising these members is of the same arrangement as mentioned in connection with the preceding embodiments.

A change-over switch 104 is operatively associated with the displacement of the flash cube so that the change-over switch 104 is closed at a terminal 104a when the flash cube is retracted into its storage position in the camera body and closed at another terminal 104b when the flash cube is extended to a predetermined position. This change-over switch 104 interrupts the current flowing through the drive means (as will be described later in detail) as the flash cube is displaced and thereby reduces the power consumed by the drive means. A switching transistor 107 connected across the base-emitter junction of the transistor 103 is turned ON or OFF in response to the signal characterizing the luminance level of the object to be photographed. This signal is applied through a diode 108 in the detector circuit C. The transistor 103 is turned ON as the object luminance exceeds a predetermined level to cause a short circuit across the base-emitter junction of the transistor 103 to stop oscillation of the source circuit A.

A capacitor 109 is similarly connected across the base-emitter junction of the transistor 103 to stabilize oscillation. The transistor 108 and capacitor 109 have already been discussed with reference to the previous embodiments.

In the firing circuit B, a serial section consisting of a diode 110, a resistor 111, and a neon lamp 112 constitutes, together with a capacitor 113 connected in parallel to the serial section, a display circuit which is lit and indicates when the charging voltage of a main discharging capacitor 114 exceeds a predetermined value. A charging resistor 115 and a capacitor 116 connected in series to each other through the diode 110, a boosting transistor 117 and a trigger switch 118 together constitute a trigger circuit of well known arrangement. The serial section of the resistor 115 and the capacitor 116, together with a discharging resistor 119 connected in parallel to the serial section, constitutes means for preventing triggering of the flash light. A flash discharge tube 120 is of well known construction and is adapted to be fired upon application of the trigger voltage from the trigger circuit and with the current discharged from the main discharging capacitor 114. A diode 121 connected forwardly with respect to the direction of the charging current to a part of the charging circuit for the main discharging capacitor 114 serves to block the current flowing from the capacitor 114 into the capacitor 113 and the trigger capacitor 116. This firing circuit B is of the same arrangement as that shown by FIG. 1.

The detector circuit C includes a Darlington circuit 122 as a switching circuit and is energized from the source battery 101 under conduction of the circuit 122. A switch 123 connected to the input side of the Darlington circuit 122 functions as a shutter button switch of the same type as shown by FIG. 3 so that upon a touch on the shutter button of the camera by the photographer's finger, the switch 123 is closed causing the Darlington circuit 122 to be conductive.

A PUT element 124, adapted to be energized through the Darlington circuit 122, has its gate applied with a divided voltage from resistors 125, 126 and has its anode applied with a divided voltage from a serial section consisting of a resistor 127, a photoconductive element 128 and an adjustable resistor 129. The PUT element 124 becomes conductive upon the establishment of a predetermined relationship between the two divided voltages.

When the object luminance is lower than a predetermined level, for example in the order of 9 to 10 LV, the PUT element 124 is conductive because the internal resistance of the photoconductive element 128 causes the anode voltage to be high. Conversely, when the object luminance is higher than the predetermined level, the PUT element 124 remains non-conductive. However, the transistor 107 is turned ON upon application of a detection signal from an output terminal P so long as the object luminance is higher than a predetermined level.

The responder circuit D comprises means for controlling the means for positioning of the flash light. As embodied herein the responder circuit D, a Darlington circuit 130 adapted to become conductive when applied with the detection signal from the detector circuit C, flash cube drive energizing means 131 adapted to be energized under conduction of the circuit 130, a capacitor 132 for energization, and a capacitor 133 to stabilize operation of the responder circuit D. The circuit D is coupled through the terminal 104a of the change-over switch 104 to the source battery 101. With the change-over switch 104 closed at the terminal 104a, the Darlington circuit 130 becomes conductive only when applied with the detection signal from the detector circuit C and remains non-conductive unless applied with this signal. The output of the drive energizing means 131 is coupled to a suitable means such as an electromagnetic mechanism or electromotor (not shown) that can cause displacement of the flash cube.

Figure 11:
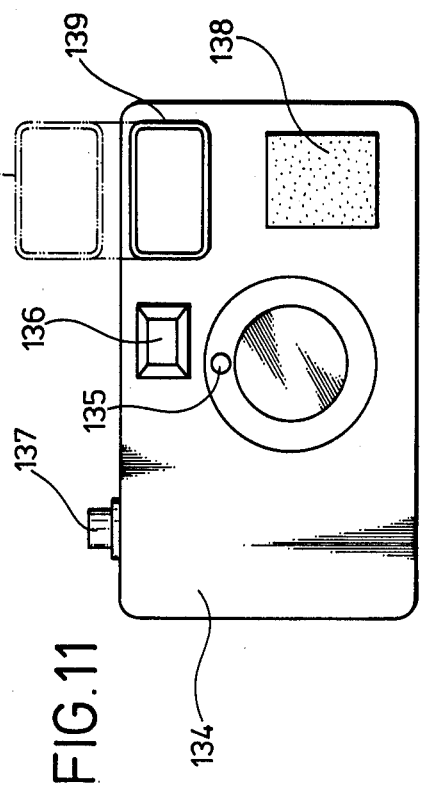
FIG. 11 is a schematic front view of a photographing camera containing the flash device of FIG. 10 therein.

FIG. 11 shows a photographic camera incorporating the flash device based on the circuit arrangement as above mentioned. Referring to FIG. 11, a photographic camera 134 includes a light receiving window 134 for the photoconductive element 128 arranged in the front side of a lens barrel, a viewfinder window 136, a sheet 138 of electrically conductive caoutchouc material forming the camera body switch arranged on a grip portion of the camera, and a flash cube 139.

The flash cube 139, comprising a flash discharge tube 120 and a reflector in the well known manner, is normally stored within a recess formed in the front side of the camera 134 adjacent the upper right corner. The flash cube 139 is provided with a spring (not shown) for normally biasing the cube 139 to extend out of the camera when in an operative position and to retract into the recess when in a non-operative position. Accordingly, the flash cube 139 may be automatically extended to a position as shown by the double-dotted chain lines in FIG. 11 by an arrangement wherein the drive energizing means 131 included in the responder circuit D releases the flash cube 139 from the locked position.

It should be noted, however, that the arrangement of the flash cube 139 is not limited to that as above mentioned. For example, the flash cube 139 may be extended by means such as an electromotor to a predetermined position and manually retracted into the recess after synchronized flash light photographing has been completed. It is also possible to provide the flash cube 139 with a spring normally pulling the flash cube 139 back into the recess so that the flash cube 139 can be extended in the operative position only when the motor's drive is activated. The position at which the flash cube 139 is to be stored and the direction of the extension or retraction may be varied as a design feature.

With the embodiment constructed as described above, the camera body switch 106 is closed simply by holding the camera 134 at its grip portion. However, that operation alone causes no oscillation of the source circuit A since the change-over switch 104 remains closed at the terminal 104a causing the Darlington circuit 130 to be non-conductive.

Upon aiming the camera 134 against an object to be photographed, the shutter button 13 may be touched with the photographer's finger to close the shutter button switch 123 and make the Darlington circuit 122 conductive.

If the luminance of the object to be photographed is higher than a predetermined luminance level, the PUT element 124 of the detector circuit C remains non-conductive and a detection signal produced by the output terminal P turns the transistor 107 ON. The detection signal produced in such case is substantially higher than the signal produced when the PUT element 24 is conductive, and, therefore, the responder circuit D is never activated by the first mentioned detection signal.

Accordingly, with respect to an object luminance higher than the predetermined level, no extension of the flash cube 139 occurs, the change-over switch 104 remains closed at the terminal 104a, and the transistor 107 causes a base-emitter short circuit of the transistor 103. As a result, no oscillation of the source circuit A takes place and neither the main discharging capacitor 114 nor the trigger capacitor 116 is charged. This means that the depression of the shutter button 37 under such situation will effectuate an ordinary photographing without a flash light discharge.

If the object luminance is lower than the predetermined luminance level at the moment that the shutter button 137 is depressed by the photographer, the PUT element 124 of the detector circuit C becomes conductive and also the Darlington circuit 130 of the responder circuit D transfers to the conductive state upon the application of a relatively low detection signal from the output terminal. The drive energizing means 131 initiates the displacement of the flash cube 139 from the storage recess to a predetermined operative position. In operative association with such displacement of the flash cube 139, the change-over switch 104 is then closed at the terminal 104b to make the source circuit A ready for oscillation. At this stage in which the flash cube 139 has already been extended, the current flowing through the drive energizing means 131 is interrupted by the change-over switch 104.

It should be recognized that the detection signal produced at this moment is of a value sufficiently low to keep the transistor 107 in an OFF state.

As a result of the operation as above described, the capacitor 109 is charged with the current flowing from the source battery 101 through the Darlington circuit 105. When the charging voltage of this capacitor 109 reaches a predetermined value, the transistor 103 is turned ON. Upon this turning ON, the source circuit A initiates oscillation and thereafter the transistor 103 is repeatedly turned ON and OFF by the magnetic saturation of the transformer core to continue the oscillation.

The oscillation causes the main discharging capacitor 114 to be progressively charged and, when the charging voltage of this capacitor 114 exceeds a predetermined value, the neon lamp 112 is lit by application of the charging voltage of the smoothing capacitor 113. Charging current for the main discharging capacitor 114 is substantially reduced as the charging voltage of the capacitor 114 exceeds the predetermined value, and, in consequence, the base current of the switching transistor 103 based on the magnetic saturation effect of the transformer core is too low to turn the transistor 103 ON. However, the oscillation persists and the neon lamp 112 also is kept lit, so long as the camera body switch 106 continues to be closed. If the hand leaves the camera in the course of such operation, the camera body switch 106 is opened and the oscillation ceases.

Thus, the trigger capacitor 116 can maintain a predetermined charging voltage so long as the oscillation continues. Accordingly, by depressing the shutter button 137 and thereby effectuating shutter release after confirming that the neon lamp 12 is properly lit for its display function, the trigger voltage can be applied to the flash discharge tube 120 via the trigger switch 118 being closed and thereby this flash discharge tube 120 can be fired.

When a sudden change occurs in the object luminance during a synchronized flash light photographing so that a flash light is no longer necessary, e.g., when the object suddenly becomes bright, the transistor 107 is turned ON with the detection signal being produced by the detector circuit C, as previously mentioned. This maintains the transistor 103 is in an OFF state. The oscillation of the source circuit A ceases even if the flash cube 139 is in its extended state, i.e., operative.

After oscillation has ceased, the smoothing capacitor 113 and the trigger capacitor 116 are discharged via the discharging resistor 119, so that the neon lamp 112 is extinguished and the trigger circuit ceases to generate the trigger voltage even after closure of the trigger switch 118. In this case, the diode 121 prevents the main discharging capacitor 114 from charging the capacitors 113, 116.

Thus it is possible to avoid a flash light discharge even when the flash cube 139 is in its extended state and when an object to be photographed becomes bright after the main discharging capacitor 114 has been charged to a level higher than a predetermined level.

Figure 12:
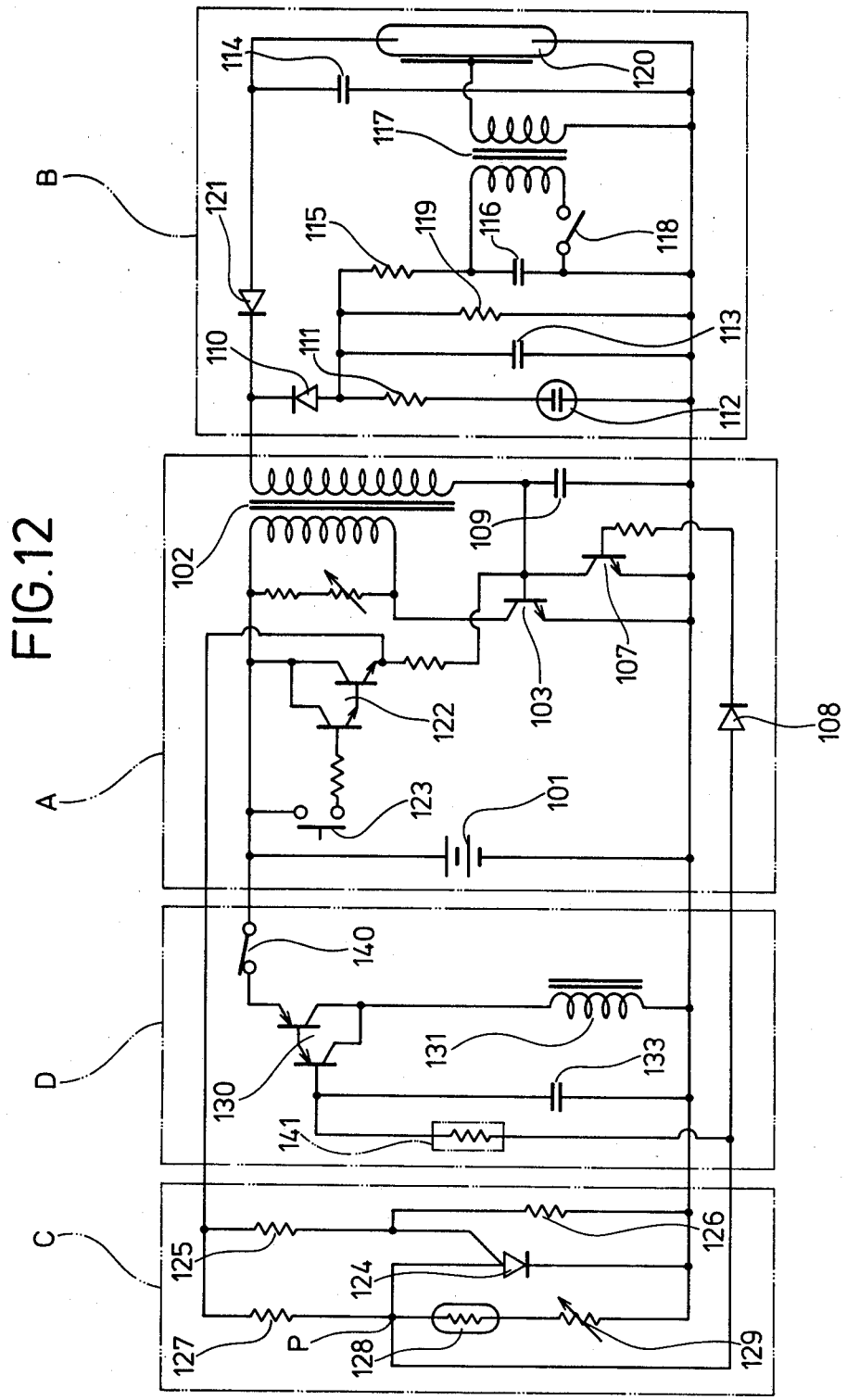
FIGS. 12 and 13 are circuit diagrams respectively illustrating additional embodiments of the flash device according to the present invention, in which the flash cube is displaced to an operative or a non-operative position in response to the luminance of an object to be photographed.

FIG. 12 is a circuit diagram illustrating another embodiment of the flash device according to the present invention, which corresponds to a simplified version of the above-mentioned embodiment as shown by FIG. 10.

In this embodiment, the camera body switch 106 is replaced by the shutter button switch 123 connected as a starter switch for the source circuit A and the change-over switch 104 is replaced by a normally-closed switch 140 connected to the energizing circuit for the drive means 131. The normally-closed switch 140 is operatively associated with the flash cube 139 so that the switch 140 is opened only when the flash cube 139 is in its extended state.

With this embodiment, upon a touch on the shutter button 137 while directing the camera 134 toward an object to be photographed, the Darlington circuit 122 becomes conductive, allowing the detector circuit C to be energized. If the object luminance at this moment is higher than a predetermined value, the transistor 107 causes a short circuit across the base-emitter junction of the transistor 103 so that oscillation of the source circuit A is blocked and no extension of the flash cube 139 occurs since the detector circuit D is not activated in this situation.

If the object luminance level is lower than the predetermined level during the operation as mentioned above, the flash cube 139 is extended in operative association with the activation of the responder circuit D, and the source circuit A initiates its oscillation, followed by the same operation as that of the embodiment as illustrated by FIG. 10.

It should be understood that a block enclosed by the double-dotted chain line within the responder circuit D corresponds to a monostable multi-circuit 141 which can be substituted for the switch 140.

In this manner, the activation duration for the drive means 131 is automatically determined since the Darlington circuit 130 is turned ON depending on the output pulse width of the monostable multi-circuit 141.

Figure 13:
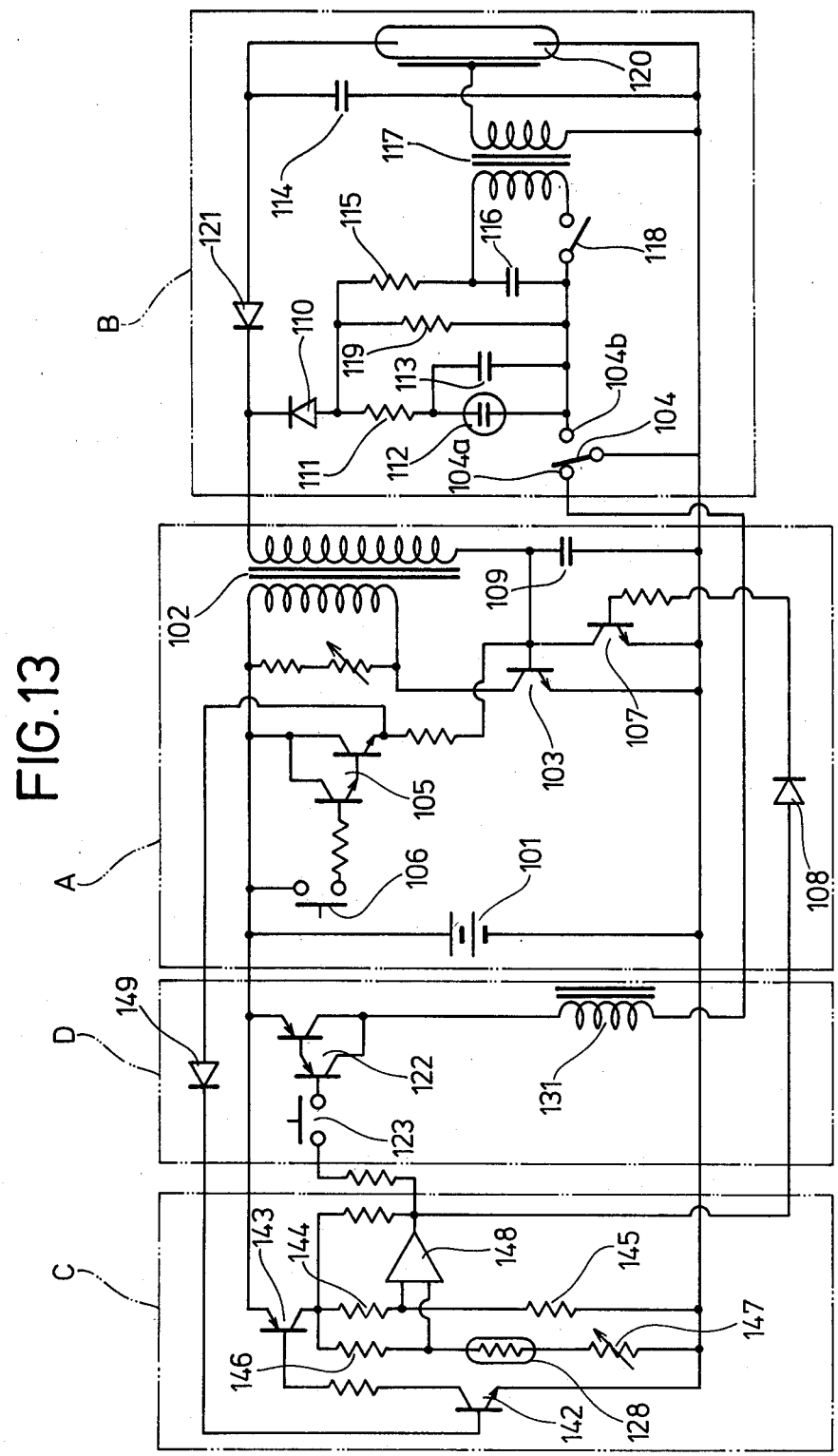

FIG. 13 is a circuit diagram illustrating still another embodiment of the flash device according to the present invention in which the responder circuit D includes the shutter button switch 123 connected to the input side thereof. The detector circuit C includes switching transistors 142, 143 cascade-connected as energizing switches and a comparator 148 to compare a divided voltage obtained from resistors 144, 145 with a divided voltage obtained from a resistor 146, the photoconductive element 128, and an adjustable resistor 147 to detect an object luminance level on the basis of the comparison. Furthermore, according to this embodiment, the display circuit and the trigger circuit both included in the firing circuit B are connected to the terminal 104b of the change-over switch 104. The rest of the circuit arrangement is substantially identical to that of FIG. 10 and, therefore, the identical circuit elements are designated by the identical reference numerals.

In this embodiment, upon closure of the camera body switch 106, the detector circuit C is energized via the Darlington circuit 105 and a counterflow check diode 149 so that the comparator 148 is turned OFF when the object luminance is higher than the predetermined level and turned ON when the object luminance is lower than the predetermined level. Accordingly, the detector circuit C applies the transistor 107 with a detection signal serving to turn the latter ON with respect to an object which is brighter than the predetermined level but applies the responder circuit D with a detection signal serving to cause the extension of the flash cube 139 in response to an object darker than the predetermined level.

The manner in which this embodiment operates is substantially similar to that in which the previous embodiment of FIG. 10 operates. According to this embodiment, however, when the camera body switch 106 is closed in response to an object luminance darker than the predetermined level, the source circuit A immediately initiates its oscillation and charges the main discharging capacitor 114. The shutter button switch 123 is thereby closed and the change-over switch 104 is closed at the terminal 104b in operative association with the extension of the flash cube 139. This results in the immediate lighting of the neon lamp 112, so that the user may evaluate the object luminance by placing a finger on the shutter button 137 and then immediately make a shutter release and an effective flash light firing.

Although the embodiments of FIGS. 10, 12, and 13 are so arranged that the transistor 107 causes a short circuit across the base-emitter junction of the oscillation transistor 103 to stop the oscillation of the source circuit A, it is also possible, as seen in FIG. 8, to provide a switching transistor adapted to interrupt the base current of the oscillation transistor 103 under control of the detector circuit C.

As has been described hereinabove, the present invention improves the photographic flash device so that its flash cube can be automatically displaced when the object luminance is darker than a predetermined level, the source switch being closed in operative association with the displacement of the flash cube, and the operation of charging can be automatically initiated, as in the last-mentioned embodiment, when the object luminance is darker than the predetermined level. In this manner, for an object to be photographed which requires synchronized flash light photographing, the flash cube can be automatically displaced and the charging operation can be automatically initiated. Furthermore, it is unnecessary for the photographer to judge the brightness or the darkness of an object to be photographed according to the present invention and, therefore, the proper exposure for synchronized flash light photographing can be easily obtained. The feature of the present invention that the flash cube need not be displaced by the photographer but is automatically displaced depending on the object luminance during synchronized flash light photographing enables the photographer to confirm activation of the flash device simply based on the displacement of the flash cube. Finally, the energy consumption by the drive means serving to displace the flash cube is advantageously reduced since the drive means is adapted to be energized for an extremely short duration according to the present invention.

It should be understood that the present invention is not limited to the embodiments which have been described and illustrated but various modifications are possible without departure from the spirit and the scope of the invention. For example, the present invention may find its application in the well known flash device in which the source switch is closed upon extension of the flash cube to an operative position. Moreover, the Darlington circuits may be replaced by other switching elements or circuits having similar functions. Finally, the camera body switch utilizing the sheet of electrically conductive caoutchouc may be replaced by a floating metallic plate supported by the camera body as a switch which is closed by manual depression.

What is claimed is:

1. A photographic flash device operatively responsive to the luminance of an object to be photographed comprising:
    a DC power source including:
        a DC-DC converter;
        means connected to the primary winding of said DC-DC converter for repetitively switching said converter ON and OFF to generate an oscillating DC signal, said switching means including a transistor having a collector connected to the primary winding of said DC-DC converter, a base, and an emitter;
    a main discharge capacitor coupled to said DC-DC converter for charging thereby;
    a flash light discharge tube coupled to said main discharge capacitor;
    means for triggering said flash light discharge tube in response to the charging of said main discharge capacitor to a predetermined level; and
    means for detecting the luminance of the object to be photographed and for terminating the charging of said main discharge capacitor if said detected luminance is greater than a preselected value, said detecting means being connected between said base and said emitter of said transistor.

2. A photographic flash device according to claim 1 wherein said DC power source further comprises:
    means in said detecting means for maintaining said switching means OFF in response to the detection that the luminance of said object to be photographed is in excess of said preselected valve.

3. A photographic flash device according to claim 1 further including energization switching means connected to the primary winding of said DC-DC converter and to said detecting means and being turned ON response to energization of the primary winding of said DC-DC converter, said detecting means being energized responsive to said energization switching means being turned ON.

4. A photographic flash device according to claim 1 further comprising:
    a trigger capacitor included in said triggering means; and
    means for discharging said trigger capacitor responsive to said switching means being turned off and to said termination of the charging of said main discharge capacitor whereby triggering of said flash light discharge tube is inhibited when the charging of said main discharge capacitor is terminated.

5. A photographic flash device according to claim 1 further including a camera body having a shutter button to be depressed during operation of the camera, the photographic flash device further including a trigger switch coupled across said shutter button and connected to said DC-DC converter, said trigger switch for initiating oscillation of said DC-DC converter responsive to actuation of the shutter button.

6. A photographic device according to claim 1 wherein said detecting means comprises:
    a photoconductive element for generating an actual voltage output signal having a level corresponding to the luminance of the object to be photographed; and
    a comparator for comparing said actual voltage level to a reference voltage level and for preventing the charging of said main discharge capacitor when said actual voltage level is not equal to said reference voltage level.

7. A photographic flash device operatively responsive to the luminance of an object to be photographed and for use with a camera including a flash light device and means for displacing the flash light device between a retracted nonoperative position and an extended operative position, the flash device comprising:
    means for detecting the luminance of the object to be photographed; and means for driving the displacing means to control the displacement of the flash light device to said operative position in response to the detected luminance of the object being less than a preselected value.

8. A photographic flash device according to claim 7 further including switching means for deenergizing said driving means at an initial stage of the displacement of the flash light device from the nonoperative position to the operative position or after the displacement of the flash light device from the nonoperative position to the operative position.

9. A photographic flash device operatively responsive to the luminance of an object to be photographed and for use with a camera including means for positioning a flash light device into a retracted, nonoperative position and into an extended, operative position, the photographic flash device comprising:
a DC power source;
charge storage means coupled to said DC power source for charging thereby;
means for triggering said flash light device when the charge level of said charge storage means exceeds a predetermined charge level;
means for detecting the luminance level of an object to be photographed and for inhibiting the charging of said charge storage means when the detected luminance level is greater than a predetermined luminance level; and
means for driving the positioning means to control the positioning of said flash light device in said operative position responsive to the detection of the luminance of the object to be photographed being less than said predetermined level and in said nonoperative position responsive to the detection of the luminance of the object to be photographed being greater than said predetermined level.

10. A photographic flash device according to claim 9 further including means coupled to said triggering means for inhibiting said triggering of said flash light device by said triggering means when the charge level of said charge storage device exceeds said predetermined charge level responsive to said detecting means detecting the luminance of said object to be photographed being in excess of said predetermined luminance level.

11. A photographic flash device according to claim 10 further including means for receiving the output of said DC power source and for converting said received output into an oscillating DC signal and wherein said charge storage means comprises a main discharge capacitor being charged by said DC oscillating signal.

12. A photographic flash device according to claim 11 wherein said camera includes a shutter button and wherein said device further includes a first flash device enable switch incorporated into the body of said camera and being switched ON responsive to the gripping of said camera and a second flash device enable switch in said camera being switched ON responsive to the actuation of the shutter of said camera, said first and second flash device enable switches being coupled to said receiving and converting means to enable the generation of said oscillating DC signal only when both of said flash device enable switches are ON.

* * * * *

UNITED STATES PATENT AND TRADEMARK OFFICE
CERTIFICATE OF CORRECTION

PATENT NO. : 4,394,079
DATED : JULY 19, 1983
INVENTOR(S) : YOSHIYUKI TAKEMATSU

It is certified that error appears in the above—identified patent and that said Letters Patent is hereby corrected as shown below:

Column 14, line 28, change "response" to --responsive--; and
          line 37, change "off" to --OFF--.

Signed and Sealed this

Seventh Day of August 1984

[SEAL]

Attest:

GERALD J. MOSSINGHOFF

Attesting Officer     Commissioner of Patents and Trademarks